Feb. 25, 1947.                D. S. GREY                 2,416,442
OPTICAL SYSTEM
Filed April 23, 1943
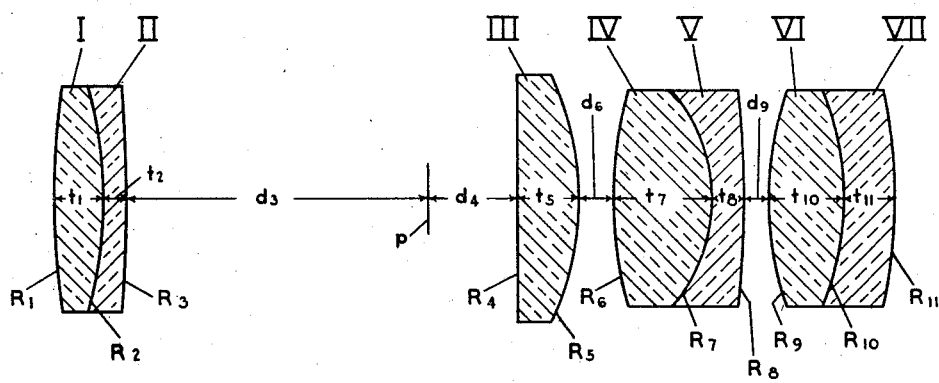
| LENS | RADIUS | THICKNESS | $N_D$ | V |
|---|---|---|---|---|
| I | $R_1 = -154.77$ | $t_1 = 9.75$ | 1.506 | 57 |
|   | $R_2 = -82.91$ |  |  |  |
| II | $R_2 = -82.91$ | $t_2 = 4.64$ | 1.591 | 31 |
|    | $R_3 = 302.28$ | $d_3 = 233.33$ |  |  |
| III | $R_4 = \infty$ | $d_4 = 17.70$ | 1.506 | 57 |
|     | $R_5 = -57.15$ | $t_5 = 12.50$ |  |  |
| IV | $R_6 = +79.13$ | $d_6 = 6.94$ | 1.506 | 57 |
|    | $R_7 = -32.60$ | $t_7 = 19.44$ |  |  |
| V | $R_7 = -32.60$ | $t_8 = 6.48$ | 1.591 | 31 |
|   | $R_8 = 201.26$ | $d_9 = 5.09$ |  |  |
| VI | $R_9 = +65.20$ | $t_{10} = 14.81$ | 1.506 | 57 |
|    | $R_{10} = -55.77$ |  |  |  |
| VII | $R_{10} = -55.77$ | $t_{11} = 10.18$ | 1.591 | 31 |
|     | $R_{11} = 102.87$ |  |  |  |
David S. Grey
INVENTOR.
BY Donald L. Brown
Attorney Patented Feb. 25, 1947

2,416,442

UNITED STATES PATENT OFFICE 2,416,442

OPTICAL SYSTEM

David S. Grey, Cambridge, Mass., assignor to Polaroid Corporation, Cambridge, Mass., a corporation of Delaware Application April 23, 1943, Serial No. 484,208

10 Claims (Cl. 88—57)

This invention relates to lens systems and, more particularly, to arrangements of lenses adapted for use in telescopes.

It is one object of the present invention to provide a novel telescope with a non-inverting positive eyepiece wherein the lens components are formed from organic resins or plastics, and which has optical characteristics, as for example power and correction, which compare favorably with corresponding telescopes of optical glass while being less expensive to manufacture.

Another object of the invention is to provide a novel non-inverting positive eyepiece.

A still further object is to provide a novel eyepiece of the above type which is adapted to cover an apparent field in excess of 50° with a focal ratio as low as F/4, and wherein the field is flat, distortion is minimized, chromatic aberrations are corrected, and definition is sharp to the edge of the field.

Another object is to provide a novel eyepiece having the above characteristics and comprising a pair of doublets and a single positive lens element, wherein said doublets are adjacent each other and said single element is foremost, i. e., nearest the focal plane.

Still another object is to provide a novel objective lens system useful in telescopic systems.

A still further object is to provide a novel objective lens of said type which is corrected for spherical aberration and coma, and which shows reduced secondary spectrum when corrected for color in the visual region.

Another object is to provide a novel objective having the above characteristics and consisting of a cemented doublet.

These and other objects and novel features of this invention will more fully appear from the following detailed description when the same is read in connection with the accompanying drawing. It is to be expressly understood, however, that the drawing is for the purpose of illustration only and is not intended as a definition of the limits of the invention, reference being primarily had for this latter purpose to the appended claims.

In the drawing there is shown a diagrammatic view of a telescope comprising one form of eyepiece and one form of objective comprehended by the present invention, and setting out the constructional data for said telescope.

As shown in the drawing, the telescope consists of an objective comprising two elements I and II, and a non-inverting, positive eyepiece comprising five elements, III, IV, V, VI, and VII.

Lens I of said objective is a positive lens of crown material. Lens II is a negative lens of flint material and of a power adapted to acromatize the objective, said lenses in this preferred form being cemented together to constitute a doublet in which lens I is foremost. In order to obtain simultaneous correction for all the aberrations, i. e., for coma, spherical aberration, and color in the visual region, in said doublet, it is important that the crown and flint materials thereof have a difference in indices of refraction between 0.07 and .1 and a difference in dispersive indices, i. e., the nu values $$\left(\frac{N_D-1}{N_F-N_C}\right)$$

between 24 and 28, the flint having the higher index of refraction. The radius $R_3$ of doublet I, II is preferably three to six times that of radius $R_2$ of the cemented surfaces of lenses I and II.

In the eyepiece, foremost lens III is spaced from the focal plane of the eyepiece $p$, by a distance $d_4$ which is equal to .3 to .4 times the focal length of the eyepiece system, the focal length of said eyepiece system being hereinafter designated by the symbol $f_E$. In the illustrated form, lens III is a positive lens of crown material and has a focal length of from $2f_E$ to $3.0f_E$. Lenses IV and V in the preferred embodiment of the invention constitute a cemented doublet which is slightly over-achromatized, and which has a focal length equal to from $2f_E$ to $4f_E$, preferably approximately $3f_E$, lens IV being a positive crown lens and lens V an achromatizing negative flint lens. Lenses VI and VII, as shown, also constitute a cemented doublet which has a focal length between $\frac{2}{3}f_E$ and $3\frac{1}{3}f_E$, preferably approximately $2f_E$, and in which lens VI is a positive crown lens and lens VII is an achromatizing flint lens, said doublet being slightly under-achromatized so as to correct the over-achromatization of the system comprising doublet IV, V and lens III. The axial spacing $d_6$ of doublet IV, V relative to lens III may vary from $\frac{1}{5}f_E$ to $\frac{1}{10}f_E$ and the axial separation $d_9$ of said doublet relative to doublet VI, VII is preferably less than $\frac{1}{8}f_E$ and may be zero, i. e., lenses V and VI may be in contact. The radius $R_{11}$ of lens VII is preferably not less than $2f_E$ and may be infinite in length, i. e., the surface generated by $R_{11}$ may be plane. The radius $R_8$ of lens V is from $2.5f_E$ to $5f_E$.

Each of the lens elements of the objective and eyelens is preferably formed from an organic resin, and a satisfactory resin for the crown material is cyclohexyl methacrylate which has an index of refraction ($N_D$) of approximately 1.506 and a nu value (V) of approximately 57. For the flint material it is preferable to employ styrene which has an index of refraction ($N_D$) of approximately 1.591 and a dispersive index (V) of approximately 31. While the said materials are preferred, other resins or optical glasses having the desired difference in nu values and in indices of refraction may be employed in accordance with the invention as will now be apparent to those skilled in the art. For example, crown and flint glasses or resins having a difference in nu values between 24 and 28 and a difference in indices of refraction between .08 and .1 wherein the flint material has the higher index of refraction, may be used for the lenses of objective I, II. Similarly, glasses or resins having a difference in nu values between 22 and 28 and in indices of refraction between 0.08 and 0.1, wherein the material of higher index of refraction has the lower dispersive index, may be used for the components of the eyelens.

The table below gives the constructional data for the lens system illustrated, by way of example, in the drawing.

The column "radius" of the table refers to the radii of the spherical surfaces as measured in linear units, for example, millimeters. The column designated "thickness" refers to the thickness of the lenses, also the air gaps between the lenses, as measured on the axis of the lens system, in the same linear units as those used to measure the "radius." The letter "$t$" indicates lens thickness and the letter "$d$" air spaces. The term "$N_D$" is used to designate the index of refraction of the materials for the lenses as measured for the yellow "D" line of a sodium arc. The column "V" designates the nu values for the lens materials used.

| Lens | Radius | Thickness | $N_D$ | V |
|---|---|---|---|---|
| I | $R_1=+154.77$<br>$R_2=-82.91$ | $t_1=9.75$ | 1.506 | 57 |
| II | $R_2=-82.91$<br>$R_3=-302.28$ | $t_2=4.64$<br>$d_3=233.33$ | 1.591 | 31 |
| III | $R_4=\infty$<br>$R_5=-57.15$ | $d_4=17.70$<br>$t_5=12.50$ | 1.506 | 57 |
| IV | $R_6=+79.13$<br>$R_7=-32.60$ | $d_6=6.94$<br>$t_7=19.44$ | 1.506 | 57 |
| V | $R_7=-32.60$<br>$R_8=-201.26$ | $t_8=6.48$<br>$d_9=5.09$ | 1.591 | 31 |
| VI | $R_9=+65.20$<br>$R_{10}=-55.77$ | $t_{10}=14.81$ | 1.506 | 57 |
| VII | $R_{10}=-55.77$<br>$R_{11}=-102.87$ | $t_{11}=10.18$ | 1.591 | 31 |

The power of the above telescope is approximately 5 and it has a true field slightly in excess of 10° so that its apparent field, i. e., the product of the magnification and true field, is in excess of 50°.

In the above embodiment of the invention, a novel telescope is provided comprising a novel objective and a novel non-inverting positive eyepiece. The apparent field of the eyepiece system is in excess of 50° for an aperture as low as F/4. The field is flat, distortion is minimized, all chromatic aberrations are corrected, and definition is sharp to the edge of the field. The objective consists of a cemented doublet which is corrected for coma, spherical aberration and color in the visual region.

Although the objective and eyepiece in combination constitute a telescopic system of unusual power, field and correction, it is to be understood that the objective is not limited to utility with the novel eyepiece nor is the latter useful only in connection with the novel objective, since either could be employed in telescopes wherein the other elements are of conventional design and formed from optical glasses. It is also to be understood that while the systems comprehended by the invention are particularly adapted to embody components of organic resins, they may include one or more lens elements of optical glass.

Since certain changes in the constructions set forth which embody the invention may be made without departing from its scope, it is intended that all matter contained in the foregoing description, or shown in the accompanying drawings, shall be interpreted as illustrative and not in a limiting sense.

What is claimed is:

1. An objective lens system corrected for coma, spherical aberration and color in the visual region, consisting of a positive lens having an index of refraction of approximately 1.51 and a nu value of approximately 57, and a negative lens having an index of refraction of approximately 1.59 and a dispersive index of approximately 31, said lenses being secured together to form a doublet in which the positive lens is foremost, the radius of curvature of the front, central and rear surfaces, measured in the same linear units, being approximately +154, −82 and −302, respectively, and the thicknesses of the positive and negative lenses being approximately 9.75 and 4.64 respectively.

2. An eyelens having a focal length 1 comprising, in combination, a positive lens of crown material having a focal length of from 2 to 2.5 and separated from the focal plane by a distance of from 0.3 to 0.4, an over-achromatized doublet comprising a positive crown lens adjacent said first-named lens and a negative flint lens remote therefrom, said doublet having a focal length of from 2 to 4, and being separated from said first lens by a distance of from 0.2 to 0.1, the radius of the surface of said doublet remote from said first lens being from 2.5 to 5.0, and an under-achromatized doublet comprising a positive crown lens adjacent said first-named doublet and a negative flint lens remote therefrom, said under-achromatized doublet having a focal length of from 0.6 to 3.3 and an outer radius of not less than 2, and being separated from said over-achromatized doublet by a distance less than .13.

3. An eyelens having a focal length 1 comprising, in combination, a positive lens of crown material having a focal length of from 2 to 2.5 and separated from the focal plane by a distance of from 0.3 to 0.4, an over-achromatized doublet comprising a positive crown lens adjacent said first-named lens and a negative flint lens remote therefrom, said doublet having a focal length of from 2 to 4, and being separated from said first lens by a distance of from 0.2 to 0.1, the radius of the surface of said doublet remote from said first lens being from 2.5 to 5.0, and an under-achromatized doublet comprising a positive crown lens adjacent said first-named doublet and a negative flint lens remote therefrom, said under-achromatized doublet having a focal length of from 0.6 to 3.3 and an outer radius of not less than 2, and being separated from said over-achromatized doublet by a distance less than .13, the crown material and flint material having a difference in indices of refraction between 0.08 and 0.10 and a difference in nu values greater than 22, the flint material having the higher index of refraction.

4. An eyelens having a focal length 1 comprising, in combination, a positive lens of crown material having a focal length of from 2 to 2.5 and separated from the focal plane by a distance of from 0.3 to 0.4, an over-achromatized doublet comprising a positive crown lens adjacent said first-named lens and a negative flint lens remote therefrom, said doublet having a focal length of from 2 to 4, and being separated from said first lens by a distance of from 0.2 to 0.1, the radius of the surface of said doublet remote from said first lens being from 2.5 to 5.0, and an under-achromatized doublet comprising a positive crown lens adjacent said first-named doublet and a negative flint lens remote therefrom, said under-achromatized doublet having a focal length of from 0.6 to 3.3 and an outer radius of not less than 2, and being separated from said over-achromatized doublet by a distance less than .13, the crown material for said lenses having an index of refraction of approximately 1.50 and a nu value of approximately 57, and the flint material for said lenses having an index of refraction of approximately 1.59 and a nu value of approximately 31.

5. An eyelens of the character described comprising five axial components, the first of which is a single positive lens, the second and third of which comprise an over-achromatized doublet and the fourth and fifth of which comprise an under-achromatized doublet, and having substantially the numerical data set forth in the following table wherein I, II, III, IV and V designate the successive lens components, $R_1$ to $R_{10}$ designate the radii of the surfaces thereof, $d_1$, $d_3$, and $d_6$ designate the air spaces between the first component and the focal plane and between the successive lens groups, $t_2$, $t_4$, $t_5$, $t_7$, and $t_8$ designate the thicknesses of the components, the column $N_D$ designates the indices of refraction of the components, and the column V designates the nu values of the components:

| Lens | Radius | Thickness | $N_D$ | V |
|---|---|---|---|---|
| I | $R_1=\infty$ $R_2=-57.15$ | $d_1=17.70$ $t_2=12.50$ | 1.506 | 57 |
| II | $R_3=+79.13$ $R_4=-32.60$ | $d_3=6.94$ $t_4=19.44$ | 1.506 | 57 |
| III | $R_5=-32.60$ $R_6=-201.26$ | $t_5=6.48$ $d_6=5.09$ | 1.591 | 31 |
| IV | $R_7=+65.20$ $R_8=-55.77$ | $t_7=14.81$ | 1.506 | 57 |
| V | $R_9=-55.77$ $R_{10}=-102.87$ | $t_8=10.18$ | 1.591 | 31 |

6. A telescope of the character described comprising seven components, the first two of which constitute a doublet objective, and the other five of which constitute a positive non-inverting eyelens comprising a positive lens and two doublets in the order named, and having substantially the numerical data set forth in the following table wherein I, II, III, IV, V, VI and VII designate the successive lens components, $R_1$ to $R_{11}$ inclusive designate the radii of the surfaces thereof, $d_3$ and $d_4$ designate the distances separating the focal plane from the adjacent lenses of objective and eyelens, respectively, $d_5$ and $d_9$ designate the separation of the lens groups of the eyelens, $t_1$, $t_2$, $t_5$, $t_7$, $t_8$, $t_{10}$ and $t_{11}$ designate the thickness of the lens components, column $N_D$ designates the indices of refraction of the components, and the column V designates the nu values of the components.

| Lens | Radius | Thickness | $N_D$ | V |
|---|---|---|---|---|
| I | $R_1=+154.77$ $R_2=-82.91$ | $t_1=9.75$ | 1.506 | 57 |
| II | $R_2=-82.91$ $R_3=-302.28$ | $t_2=4.64$ $d_3=233.33$ | 1.591 | 31 |
| III | $R_4=\infty$ $R_5=-57.15$ | $d_4=17.70$ $t_5=12.50$ | 1.506 | 57 |
| IV | $R_6=+79.13$ $R_7=-32.60$ | $d_6=6.94$ $t_7=19.44$ | 1.506 | 57 |
| V | $R_7=-32.60$ $R_8=-201.26$ | $t_8=6.48$ $d_9=5.09$ | 1.591 | 31 |
| VI | $R_9=+65.20$ $R_{10}=-55.77$ | $t_{10}=14.81$ | 1.506 | 57 |
| VII | $R_{10}=-55.77$ $R_{11}=-102.87$ | $t_{11}=10.18$ | 1.591 | 31 |

7. A telescope of the character described comprising an objective lens system consisting of a positive lens of crown material and a negative lens of flint material secured together to form a doublet which is corrected for spherical aberration, coma, and color within the visual region, the difference in indices of refraction between said flint and crown materials being between .08 and 0.1 and the difference in nu values between 24 and 28, with the flint material having the higher index of refraction, and an eyelens of focal length 1 comprising a positive lens of crown material having a focal length of from 2 to 2.5 and separated from the focal plane by a distance of from .3 to .4, an over-achromatized doublet comprising a positive crown lens adjacent said first-named lens and a negative flint lens remote therefrom, said doublet having a focal length of from 2 to 4, and being separated from said first lens by a distance of from 0.2 to 0.1, the radius of the surface of said doublet remote from said first lens being from 2.5 to 5.0, and an under-achromatized doublet comprising a positive crown lens adjacent said first-named doublet and a negative flint lens remote therefrom, said under-achromatized doublet having a focal length of from 0.6 to 3.3 and an outer radius of not less than 2, and being separated from said over-achromatized doublet by a distance less than .13.

8. An eyelens having a focal length 1 comprising in succession a foremost positive lens of crown material having a focal length of at least 2, an over-achromatized positive doublet having a focal length of at least 2 and consisting of a foremost positive crown lens followed by a negative flint lens, and an under-achromatized positive doublet having a focal length of at least 0.6 and consisting of a foremost positive crown lens followed by a negative flint lens, said over-achromatized doublet being separated from said foremost positive lens and from said under-achromatized doublet by small fractions of the focal length of the eyelens with the separation for the foremost positive lens being the greater, said lenses of crown material having substantially similar indices of refraction and nu values and said lenses of flint material having substantially similar indices of refraction and dispersion value, with the index of the flint material being the higher.

9. A telescope of the character described comprising an objective corrected for coma, spherical aberration and color in the visual region and consisting of a positive lens of crown material and a negative lens of flint material secured in contact to provide a doublet the foremost surface of which has a radius approximately twice as great as the radius of the contacting surfaces and the back surface of which has a radius of curvature approximately twice as great as said foremost surface, a non-inverting, positive achromatized eyelens having a focal length of 1 and comprising in succession a foremost positive lens of crown material having a focal length of at least 2, an over-achromatized positive doublet having a focal length of at least 2 and consisting of a foremost positive crown lens followed by a negative flint lens, and an under-achromatized positive doublet having a focal length of at least 0.6 and consisting of a foremost positive crown lens followed by a negative flint lens, said over-achromatized doublet being separated from said foremost positive lens and from said under-achromatized doublet by small fractions of the focal length of the eyelens with the separation for the foremost positive lens being the greater, said foremost lens being spaced from the focal plane of the eyelens by a fraction of the focal length of the eyelens which fraction is slightly greater than the spacing between said foremost lens and over-achromatized doublet, said objective having a focal length approximately equal to from five to six times that of the eyelens, said lenses of crown material having substantially similar indices of refraction and nu values and said lenses of flint material having substantially similar indices of refraction and dispersion values with the index of the flint material being the higher.

10. An objective lens system corrected for coma, spherical aberration and color in the visual region, consisting of a positive lens of crown material and a negative lens of flint material, said lenses being secured together to form a doublet in which the positive lens is foremost, the radius of curvature of the front, central and rear surfaces measured in the same linear units being approximately +154, −82, and −302, respectively and the thickness of the positive and negative lenses being approximately 9.75 and 4.64 respectively, said lenses having a difference in indices of refraction between 0.07 and 0.1 and a difference in nu values between 24 and 28 with the flint material having the higher index of refraction.

DAVID S. GREY.

REFERENCES CITED

The following references are of record in the file of this patent:

UNITED STATES PATENTS

| Number    | Name       | Date           |
|-----------|------------|----------------|
| 576,896   | Rudolph    | Feb. 9, 1897   |
| 1,468,762 | Taylor et al. | Sept. 25, 1923 |
| 2,135,531 | Reichert   | Nov. 8, 1938   |
| 1,980,483 | Hill       | Nov. 13, 1934  |
| 2,057,674 | Fields     | Oct. 20, 1936  |
| 2,193,742 | Rohm et al. | Mar. 12, 1940 |
| 1,479,229 | Erfle      | Jan. 1, 1924   |
| 1,584,271 | Bertele    | May 11, 1926   |
| 1,584,272 | Bertele    | May 11, 1926   |
| 2,254,440 | Moulton    | Sept. 2, 1941  |
| 1,168,873 | Florian    | Jan. 18, 1916  |
| 1,863,099 | Bowen      | June 14, 1932  |

FOREIGN PATENTS

| Number  | Country | Date           |
|---------|---------|----------------|
| 490,381 | British | Aug. 15, 1938  |
| 679,047 | French  | Jan. 5, 1930   |